(12) United States Patent
Springfield et al.

(10) Patent No.: US 8,151,104 B2
(45) Date of Patent: Apr. 3, 2012

(54) ESTABLISHING USER-DEFINED MANAGEMENT ENGINE DEFAULT SETTINGS STORED IN A SYSTEM MEMORY

(75) Inventors: Randall S. Springfield, Chapel Hill, NC (US); Howard Locker, Cary, NC (US); David C. Challener, Raleigh, NC (US); Joseph M. Pennisi, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 946 days.

(21) Appl. No.: 12/147,681

(22) Filed: Jun. 27, 2008

(65) Prior Publication Data

US 2009/0327687 A1   Dec. 31, 2009

(51) Int. Cl.
*G06F 15/177* (2006.01)

(52) U.S. Cl. .................. 713/100; 713/1; 713/2

(58) Field of Classification Search .................. 713/1, 2, 713/100
See application file for complete search history.

(56) References Cited

U.S. PATENT DOCUMENTS

| | | | | |
|---|---|---|---|---|
| 5,327,531 A * | 7/1994 | Bealkowski et al. | ........... | 714/6.1 |
| 6,308,265 B1 * | 10/2001 | Miller | .............. | 713/2 |
| 6,571,347 B1 * | 5/2003 | Tseng | ............ | 714/6.1 |
| 6,625,730 B1 * | 9/2003 | Angelo et al. | .................... | 713/2 |
| 6,763,457 B1 * | 7/2004 | Aguilar et al. | .................... | 713/2 |
| 7,624,452 B2 * | 11/2009 | Young et al. | .................... | 726/30 |
| 2008/0288769 A1* | 11/2008 | Shih et al. | .................... | 713/100 |
| 2009/0063670 A1* | 3/2009 | Crayford et al. | .............. | 709/223 |

* cited by examiner

*Primary Examiner* — Nitin Patel
(74) *Attorney, Agent, or Firm* — Ference & Associates LLC

(57) ABSTRACT

The employment of a process of applying user-defined defaults to a management engine or analogous arrangement, wherein a system BIOS calls or recalls such defaults, as needed, from NVRAM responsive to the need for a reset of defaults.

19 Claims, 3 Drawing Sheets

ESTABLISHING USER-DEFINED MANAGEMENT ENGINE DEFAULT SETTINGS STORED IN A SYSTEM MEMORY

FIELD OF THE INVENTION

The present invention relates generally to computer systems and to methods and arrangements for establishing customer/user defaults in computer systems.

BACKGROUND OF THE INVENTION

Active Management Technology (AMT) is an emerging technology finding increasingly widespread use. A version produced by Intel is known as "Intel AMT", or "iAMT". Background information regarding iAMT may be found at www [.] dot intel [.] dot com [/] slash software [.] dot amt2. Generally, an AMT such as iAMT will contain a Management Engine (ME) which includes a service processor, dedicated firmware for the service processor, and logic in an Ethernet and/or 802.11 and/or WAN controller to allow the ME to communicate with other locations across the internet even when the system is off.

Typically, AMT defaults are pre-set at the factory, but users increasingly are requesting their own set of unique defaults. Clearly, this is cumbersome as higher manufacturing costs are necessary for customizing unique "planars" (or boards), and in turn this creates greater opportunity for defects. In other words, at best, present solutions involve physically altering one part or another on the board, which not only is costly but—given the added steps involved—provides greater challenges for quality control.

Accordingly, a compelling need has been recognized in connection with establishing unique customer defaults in a more cost-effective manner with greater assurances of quality.

SUMMARY OF THE INVENTION

Broadly contemplated herein, in accordance with at least one presently preferred embodiment of the present invention, is the employment of an external medium in applying user-defined defaults to a management engine or analogous arrangement, wherein a system BIOS calls or recalls such defaults, as needed, from NVRAM responsive to the need for a reset of defaults.

In summary, one aspect of the invention provides a method comprising: ascertaining, during a system boot, a computer system default set in effect; comparing the computer system default set in effect to a predetermined default set; and reverting the computer system default set in effect to the predetermined default set responsive to ascertaining a computer system default set in effect different from the predetermined default set; the reverting comprising: reading the predetermined default set from NVRAM; and prompting a default reset, whereby the predetermined default set goes into effect.

Another aspect of the invention provides an apparatus comprising: a main memory; a NVRAM; a manager in communication with the main memory and the NVRAM, the manager acting to: ascertain, during a system boot, a default set in effect; compare the default set in effect to a predetermined default set; and revert the default set in effect to the predetermined default set responsive to ascertaining a computer system default set in effect different from the predetermined default set; the manager further comprising a reader which reads the predetermined default set from the flash memory; the manager further acting to prompt a default reset, whereby the predetermined default set goes into effect.

Furthermore, an additional aspect of the invention provides a program storage device readable by machine, tangibly embodying a program of instructions executable by the machine to perform a method comprising: ascertaining, during a system boot, a computer system default set in effect; comparing the computer system default set in effect to a predetermined default set; and reverting the computer system default set in effect to the predetermined default set responsive to ascertaining a computer system default set in effect different from the predetermined default set; the reverting comprising: reading the predetermined default set from flash memory; and prompting a default reset, whereby the predetermined default set goes into effect.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
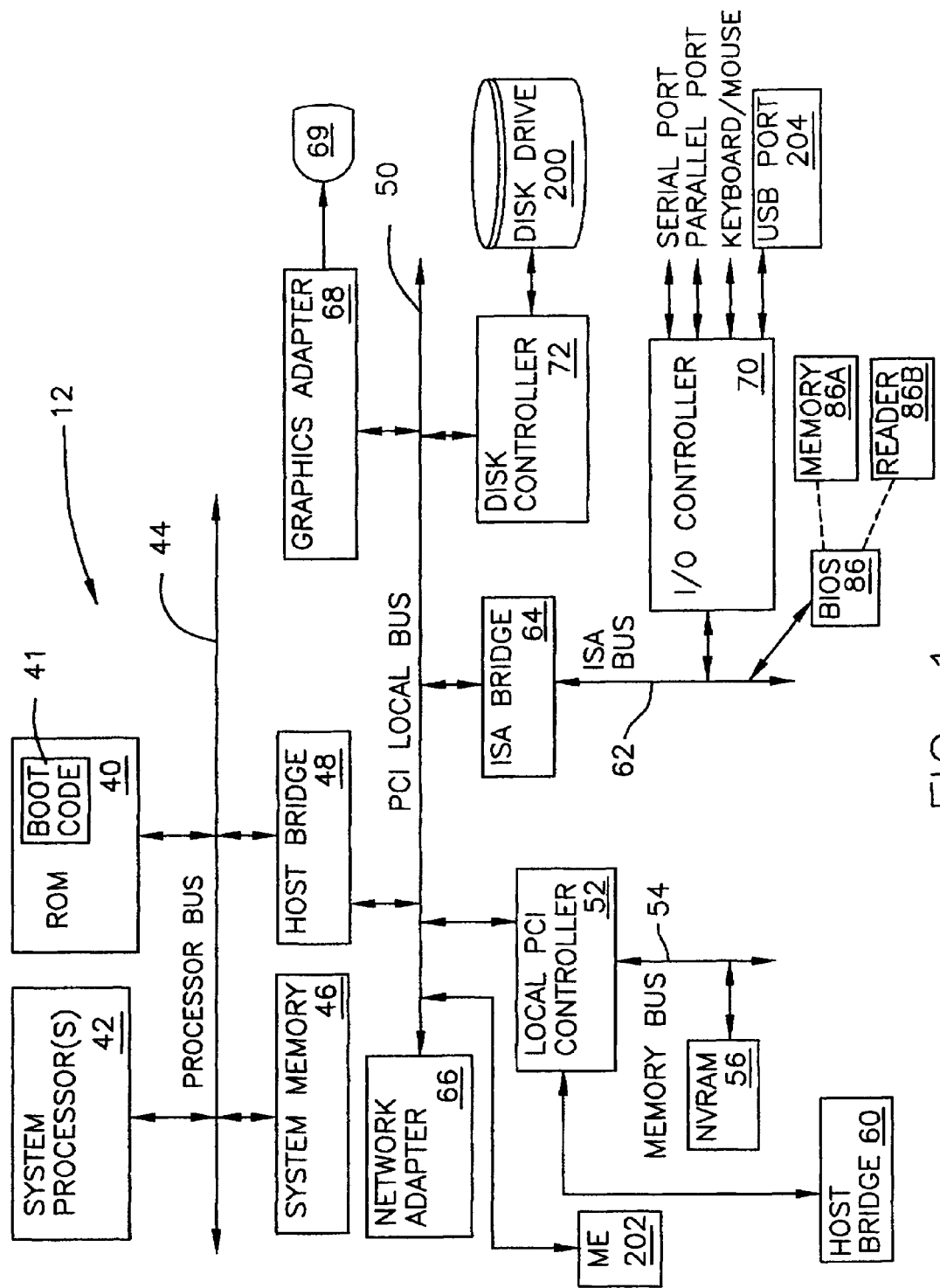
FIG. 1 schematically illustrates a computer system with added components.
Figure 2:
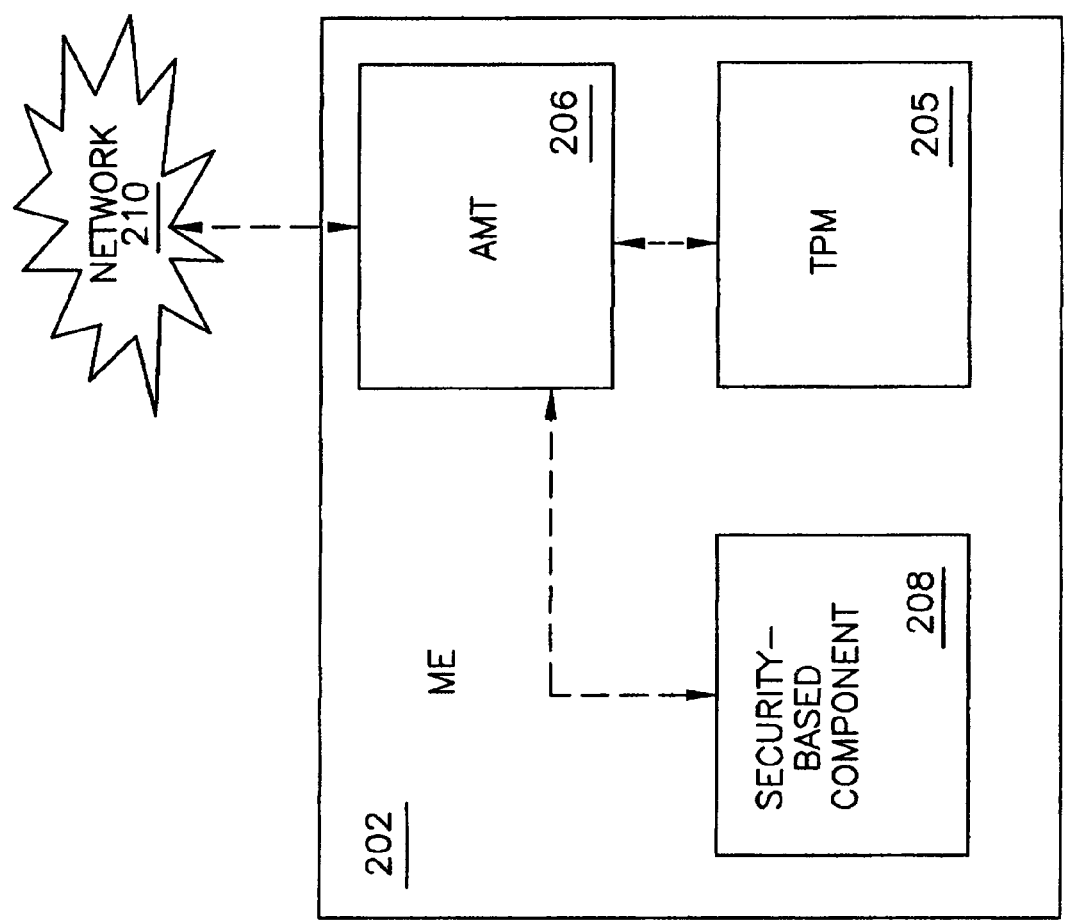
FIG. 2 schematically illustrates a ME and components.
Figure 3:
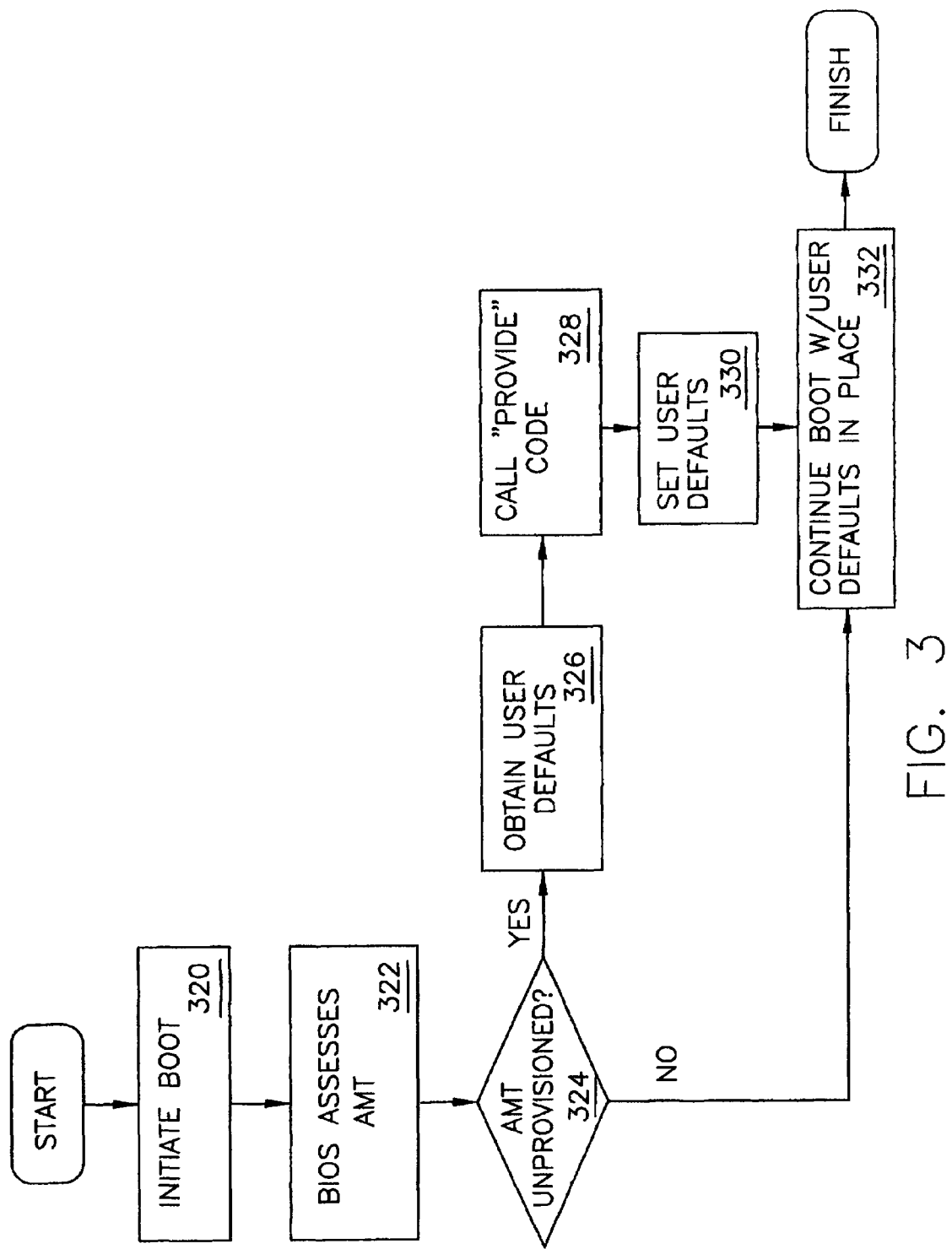
FIG. 3 schematically illustrates a process flow for establishing user defaults.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

Indicated at 202 is a ME (management engine) which may be employed in accordance with at least one presently preferred embodiment of the present invention. ME's, as currently evolving (examples of which are being manufactured by Intel), are inclusive of several useful components that previously were operationally segregated. By integrating such components operationally, they can be more readily and flexibly managed to address contingent problems such as shutting down at least portions of a computer when the computer is in the hands of an unauthorized user. With regard to the system 12 shown in FIG. 1, the ME may be located on the PCI bus 50 as shown. It should be understood that the system 12 of FIG. 1 provides but one illustrative and non-restrictive example among a very wide variety of systems that can employ an ME in accordance with embodiments of the present invention.

Indicated at 86 is a BIOS (basic input/output system) whose functioning, in accordance with at least one presently preferred embodiment of the present invention, will be better understood from further discussion herebelow. As is known conventionally, associated with BIOS 86 is a flash memory 86*a*.

As shown schematically in FIG. 2, ME 202 may preferably include a Trusted Platform Module (TPM) 205, Active Management Technology (AMT) 206 (which preferably is embodied by Intel AMT, or iAMT) and one or more security-based components 208. It will be noted, for the purposes of ongoing discussion herein, that those AMT's (and related software) and TPM's as manufactured by Intel are often referred to as "iAMT" and "iTPM" Background information regarding iAMT may be found at www [.] dot intel [.] dot com [/] slash software [.] dot amt2, while background information regarding TPM's may be found at the Trusted Computing Group website, www [.] dot trustedcomputinggroup [.] dot org.

Generally, an AMT such as iAMT will contain a Management Engine (ME) which is a service processor, dedicated firmware for the service processor, and logic in an Ethernet and/or 802.11 and/or WAN controller to allow the ME to communicate with other locations across the internet even when the system is off, as these parts will always have power (i.e., very little power is required). Accordingly, one may send items to the ME 202, and it can process and return items irrespective of whether the main operating system (OS) is running or not running. Thus, ME 202 enables contact with a network (210) even when the system is technically off. The network interface can be realized directly or indirectly via essentially any suitable arrangement, e.g., a network adapter such as that indicated at 66 in FIG. 1.

With continued reference to both FIGS. 1 and 2, as currently evolving in the context of AMT, architecture has been developed that includes an arrangement whereby BIOS 86 can read (e.g., via a reader arrangement 86*b*) a configuration record off of an external medium (for example, a USB key as inserted at a USB port 204) and thence configure the AMT 206 via this record. (This general arrangement is disclosed, by way of background information, at http [://] colon slash slash communities [.] dot intel [.] dot com/docs/DOC-1247#USB2.) Intel currently provides such architecture in the context of iAMT. Essentially, then, rather than burdening a user with the need to manually enter AMT configuration data (e.g., via a keyboard), a USB key or other external medium can readily contain such information and thence be introduced to system 12, e.g., during a boot (while a USB key is inserted in USB port 204). Such information is thence accepted by the AMT 206 and typically includes a set of parameters that enables AMT 206 to securely communicate with a server over network 210.

In accordance with at least one presently preferred embodiment of the present invention, there are broadly contemplated herein arrangements for employing an encrypted version of an AMT configuration record that has been written into essentially any system NVRAM, but most preferably flash memory 86*a* associated with BIOS 86, wherein the configuration record itself was already read by the BIOS 86 off a USB key as just described. A major benefit of this is that the user-defined or user-preferred configuration record that has derived from a USB key can be stored in the flash memory to be easily accessed in the future to the extent needed or desired. For instance, this may be of use when or if the system 12 loses battery power and as a matter of course reverts to factory defaults (especially, defaults not defined by the user) for the AMT. Here, in accordance with a presently preferred embodiment of the present invention, the BIOS 86 will automatically retrieve the user's own defined or preferred defaults at such a point in a rather quick and easy manner, as opposed to having them reestablished via a cumbersome process involving a reworking of the "board" or other physical manipulation of parts of system 12.

To this end, essentially, BIOS 86 will preferably be configured to detect whether or not a user's pre-defined AMT defaults are in effect. Referring now to a basic process, in accordance with at least one presently preferred embodiment of the present invention, as illustrated in FIG. 3 (with continued reference to FIGS. 1 and 2 as well), if, after initiation of a system boot (320), AMT 206 is detected by BIOS 86 (322) to be unprovisioned, that is, in a state (324/"YES") where basic or factory defaults are in effect rather than a user's pre-defined defaults as previously obtained from a USB key, then the BIOS 86 can preferably proceed to act to revert the AMT to the user's pre-defined set of defaults. (Otherwise [324/"NO"], the boot continues with the user's pre-defined defaults already in place [332], essentially bypassing other steps now to be described.)

Continuing, BIOS 86 may obtain (326) the pre-defined user defaults from NVRAM (e.g., flash memory) 86a via, e.g., a BIOS utility that previously has been provided to BIOS (e.g., during manufacture). Then, in accordance with an illustrative and non-restrictive embodiment, BIOS 86 may preferably call (328) a "provide" code (e.g., an Intel provide code such as MEBX, or Management Engine BIOS Extension) with an input constituted by the configuration record (that had been read by the BIOS off an external medium), thereby prompting the provision (or re-provision) of the user-defined defaults to the AMT (330). Thereupon, the system boot continues (332).

Any of a very wide variety of protection arrangements or processes may conceivably be employed to protect the configuration record. In accordance with a particularly preferred embodiment of the present invention, a key may be stored in system 12 in protected NVRAM (e.g., as indicated at 56 in FIG. 1); in this manner, an unauthorized user and/or unauthorized "rogue" program would not be able to add a configuration record.

By way of further elaboration and recapitulation, in accordance with at least one presently preferred embodiment of the present invention, a BIOS may preferably accept AMT configuration data (i.e., user default data) from any external medium and then retain such data in NVRAM.

Subsequently, when the BIOS boots up, this record of configuration data can be obtained from the NVRAM and then sent to the appropriate code (e.g., the Intel MEBX code) to initialize the AMT in accordance with the settings obtained from flash. Accordingly, user-defined default settings for AMT will always be readily available for the user without necessitating an expensive or potentially risky reworking of the system "boards". Distilled another way, some basic steps in accordance with at least one preferred embodiment of the present invention involve, essentially: embedding an AMT configuration record into BIOS flash memory; employing the BIOS to present this USB-based record to an appropriate code (such as MEBX) itself employed for initializing AMT; and thereupon setting the AMT to the USB-based user-defined (or user-specific) defaults.

While the foregoing discussion makes note of the provision of user-based defaults via a USB key, they can certainly be provided via other types of suitable external media. For instance, a utility can readily build a file for "provisioning" (providing AMT defaults) that can be written to NVRAM (e.g., flash memory) without ever using a USB key. Essentially, once the file is built, it can be sent to BIOS via essentially any of a very wide variety of conceivable methods. By way of an illustrative and non-restrictive example, since it may well be cumbersome to employ a USB during a manufacturing process, an alternative arrangement could involve the provision of a file to BIOS via network access during manufacturing.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
ascertaining, during a system boot, a computer system default set in effect;
comparing the computer system default set in effect to a user-defined predetermined default set; and
reverting the computer system default set in effect to the user-defined predetermined default set responsive to ascertaining a computer system default set in effect different from the user-defined predetermined default set;
said reverting comprising:
reading the user-defined predetermined default set from non-volatile random access memory (NVRAM); and
prompting a default reset, whereby the user-defined predetermined default set goes into effect.

2. The method according to claim 1, wherein said ascertaining, comparing and reverting are performed by a system basic input/output system (BIOS).

3. The method according to claim 1, wherein said ascertaining comprises ascertaining an active management technology default set in effect and said comparing comprises comparing the active management technology default set in effect with a predetermined active management technology default set.

4. The method according to claim 1, wherein said reading comprises reading a user-defined predetermined default set that has been written into NVRAM by a BIOS-authorized process.

5. The method according to claim 4, wherein said reading of a user-defined predetermined default set that has been written into NVRAM by a BIOS-authorized process comprises reading an encrypted default set that has been written into NVRAM by a BIOS-authorized process.

6. The method according to claim 1, wherein said reading comprises reading a user-defined predetermined default set that has been obtained from an external medium and written into NVRAM.

7. The method according to claim 6, wherein the external medium comprises a universal serial bus (USB) key.

8. The method according to claim 1, wherein said prompting comprises prompting a provisioning code to place the user-defined predetermined default set in effect.

9. The method according to claim 1, wherein said NVRAM comprises flash memory.

10. An apparatus comprising:
a main memory;
a non-volatile random access memory (NVRAM);
a manager in communication with said main memory and said NVRAM, said manager acting to:
ascertain, during a system boot, a default set in effect;
compare the default set in effect to a user-defined predetermined default set; and
revert the default set in effect to the user-defined predetermined default set responsive to ascertaining a computer system default set in effect different from the user-defined predetermined default set;
said manager further comprising a reader which reads the user-defined predetermined default set from said NVRAM;
said manager further acting to prompt a default reset, whereby the user-defined predetermined default set goes into effect.

11. The apparatus according to claim 10, wherein said manager comprises a system basic input/output system (BIOS).

12. The apparatus according to claim 10, further comprising:
active management technology;
the default set in effect and the user-defined predetermined default set being associated with said active management technology.

13. The apparatus according to claim 10, wherein:
said manager comprises a system BIOS; and
the user-defined predetermined default set comprises a default set written into said NVRAM by a BIOS-authorized process.

14. The apparatus according to claim 13, wherein the user-defined predetermined default set comprises an encrypted default set written into said NVRAM by said BIOS-authorized process.

15. The apparatus according to claim 10, wherein said user-defined predetermined default set originates from an external medium.

16. The apparatus according to claim 15, wherein the external medium comprises a universal serial bus (USB) key.

17. The apparatus according to claim 10, wherein said manager acts to prompt a provisioning code to place the user-defined predetermined default set in effect.

18. The method according to claim 10, wherein said NVRAM comprises flash memory.

19. A program storage device readable by machine, tangibly embodying a program of instructions executable by the machine to perform a method comprising:
ascertaining, during a system boot, a computer system default set in effect;
comparing the computer system default set in effect to a user-defined predetermined default set; and
reverting the computer system default set in effect to the user-defined predetermined default set responsive to ascertaining a computer system default set in effect different from the user-defined predetermined default set;
said reverting comprising:
reading the user-defined predetermined default set from non-volatile random access memory (NVRAM); and
prompting a default reset, whereby the user-defined predetermined default set goes into effect.

* * * * *